UNITED STATES PATENT OFFICE.

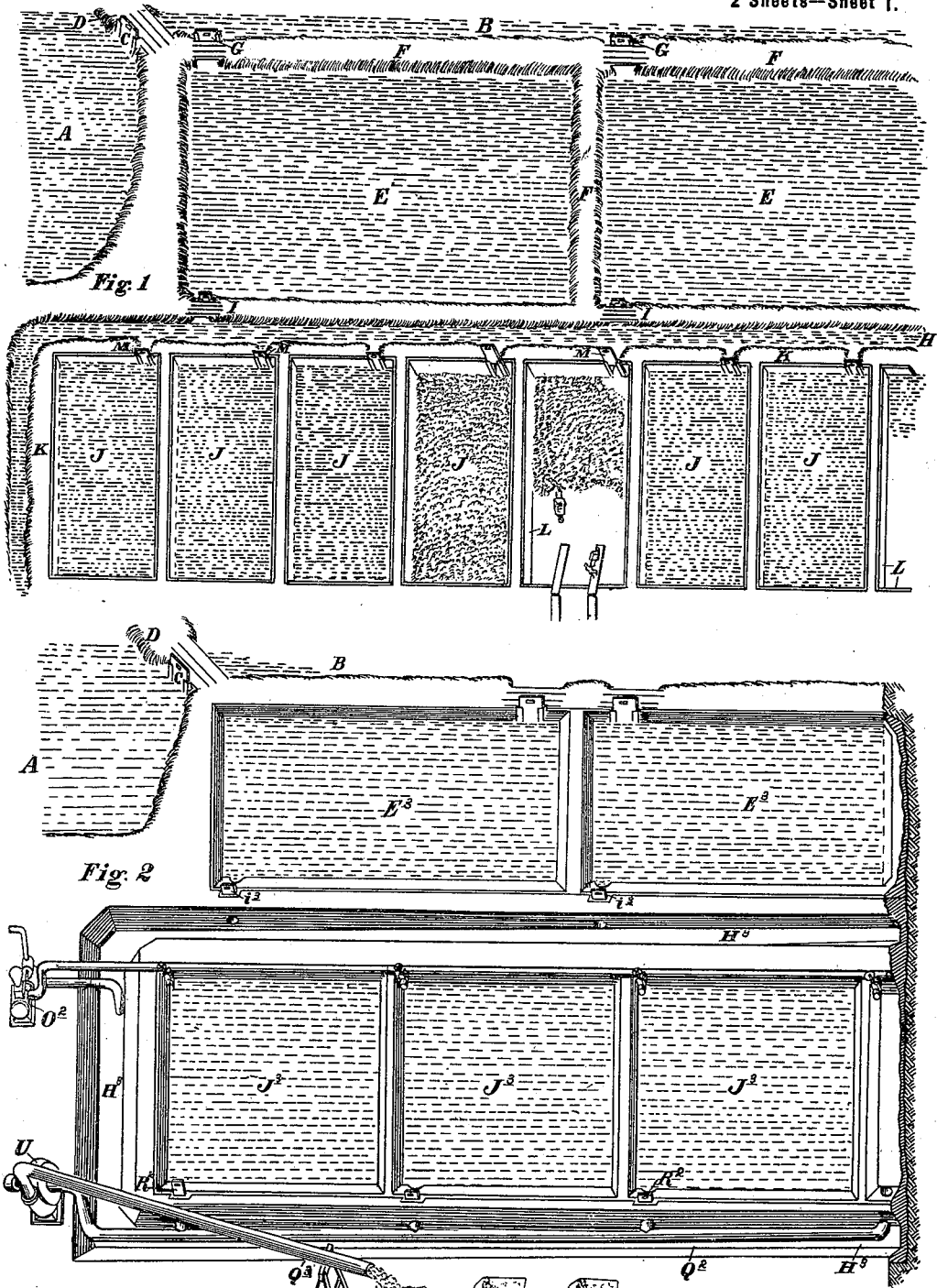

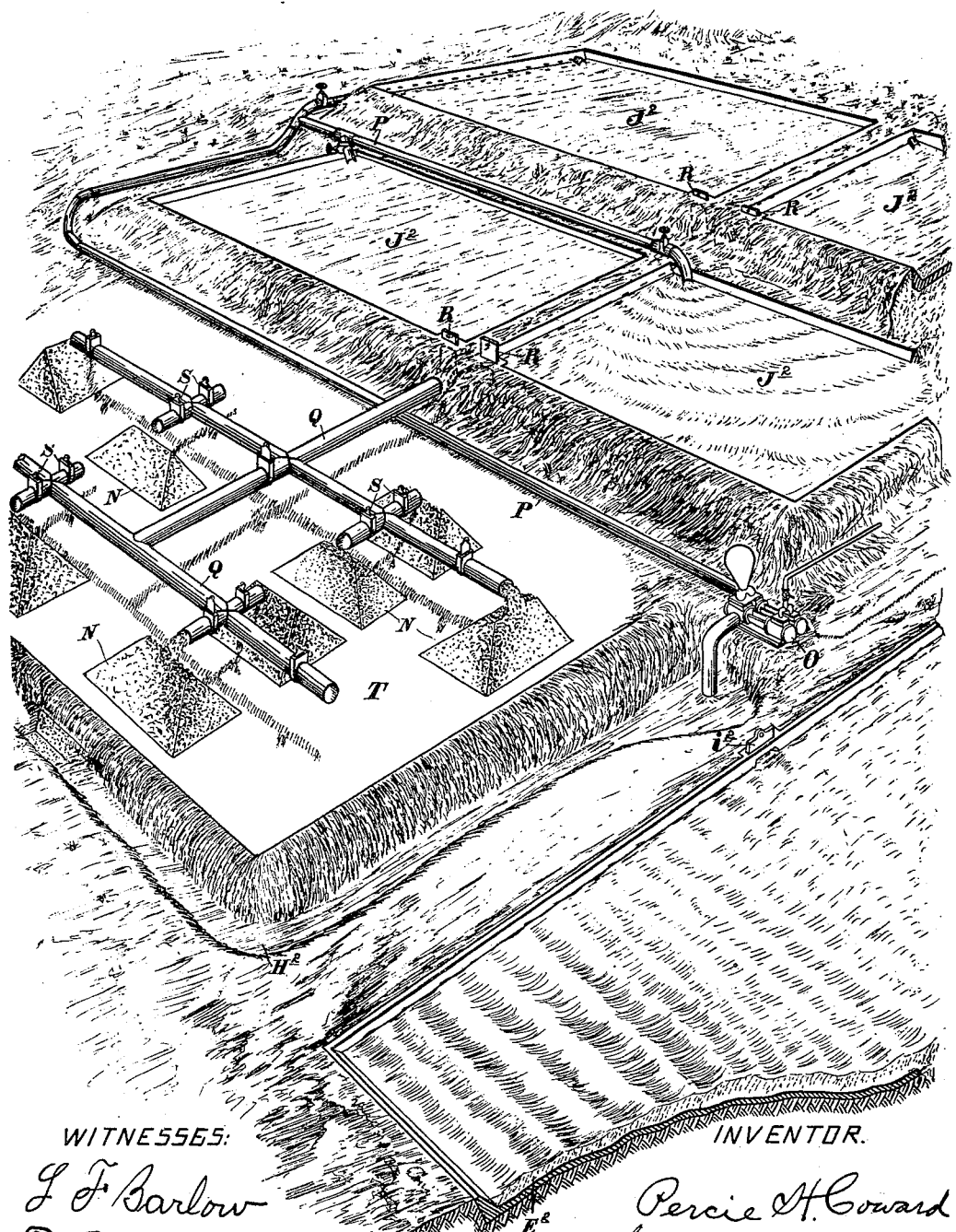

PERCIE H. COWARD, OF SAN FRANCISCO, CALIFORNIA.

PROCESS OF OBTAINING SALT.

SPECIFICATION forming part of Letters Patent No. 681,407, dated August 27, 1901.

Application filed June 27, 1900. Serial No. 21,858. (No specimens.)

*To all whom it may concern:*

Be it known that I, PERCIE H. COWARD, a citizen of the United States of America, and a resident of the city and county of San Francisco, State of California, have invented certain new and useful Improvements in the Art of Obtaining Salt, of which the following is a specification.

This invention relates to means for obtaining salt from sea water or brine through solar evaporation or artificial heat.

The object of it is to produce a purer and cleaner article than is produced by any of the methods heretofore followed and the apparatus employed to carry out the same. The method that I follow and the apparatus that I employ enable me to make better salt, more rapidly, with greater economy, and with less labor than was ever done before, and, moreover, to obtain it in places hitherto considered unavailable for the production of salt.

I shall refer to the drawings accompanying this specification for a detailed statement, description, and illustration of my method and apparatus aforesaid.

In the said drawings, Figure 1 is a diagrammatic view, slightly in perspective, showing salt-works such as are now in operation at various places where the old ways and methods of producing "solar-evaporated" salt are practiced. Fig. 2 is a similar view showing how the old salt-works can be altered or remodeled to make salt according to my improved process. Fig. 3 is a perspective view of a plant or salt-works specially designed to carry out my invention and embodying one of the best forms thereof.

Like reference-signs indicate like parts in the three said figures.

The nature and aim of my invention will be better understood and more clearly defined by a brief reference to and comparison with what I believe to be the process most commonly followed by people engaged in the salt-making industry, and which, so far as I am aware, has not been materially departed from or varied from the earliest ages when the manufacture of salt became an art up to the present time. The plant used for carrying out this old process is fairly well illustrated in Fig. 1 of the drawings. The water from which the salt is obtained is either drawn from the sea, or a bay or a canal connected therewith, represented by A on the left of said Fig. 1. From the supply source A the salt water is run into a receiving-pond or intake-reservoir B through gates, as C, provided for the purpose in dikes, such as D, which are built to confine the water during extremely high tides. This pond or reservoir is not shown in full in the drawings, owing to their restricted dimensions, the letter B merely indicating the water's edge, but, as will be understood, it is made so as to hold a body of water proportionate to the capacity of the plant to turn out salt and spread in a more or less thin sheet to favor its condensation. Several receiving-ponds are sometimes used. The condensed water is transferred successively from the receiving pond or ponds B to a number of smaller ponds E, where it evaporates still more, getting stronger in each succeeding pond E until it has become a saturated brine. In other words, the water in the large receiving-pond is drawn off as wanted into any one of the smaller ponds and is slowly worked over from one small pond to another as it becomes denser, being held a certain length of time in each till it gets to be a saturated solution in the last pond. These ponds E may be called "liming-ponds," as it is in them that the salt water is rid of its sulfate of lime, which deposits in the bottom of the ponds when the water is at a density of about 15° Baumé. They are surrounded by embankments or levees F, in which are gates G to let in the water from the receiving-pond above. Being freed from lime and brought up to the proper degree of concentration—say to a density of 25° Baumé—the water is run into a ditch H through gates I and from there is let into small crystallizing-ponds J. The land on which these salt-works are laid out is frequently a fairly hard blue clay—that is to say, land of this character is preferred and usually selected. The heavy growth of sea-weed is not disturbed in the large pond B, nor is it disturbed in the adjoining ponds E, where, however, it is killed off gradually by the salt; but in the crystallizing-ponds, where the salt is precipitated, the soil is excavated more or less, leveled off, and rolled with a heavy roller to get as hard a foundation as possible thereby.

This is surrounded by dikes K, with boards L inside the earthworks, and gates M. The salt is crystallized on the thus-prepared bottom of the small ponds J. When the salt is ready to be gathered, after it is precipitated and the remaining water run off back into the ditch H, it is shoveled up into ridges or small heaps, which are allowed to stand for some little time in the crystallizing-ponds to allow as much as possible of the bittern or mother-liquor to drain off, which still remains after the salt has been precipitated from the sea-water. After that the salt is taken out of the crystallizing-ponds by manual labor— for instance, with wheel-barrows passed over running-boards, as indicated in Fig. 1 of the drawings, or in the more pretentious and important places small portable tracks are laid down between the rows of salt heaps and the salt is shoveled up into a small car, which is run out of the crystallizing-pond by hand and dumped or unloaded at the base of a large pile, such as is shown at N, Fig. 2. The salt is then shoveled up into the large pile. The salt piles N are each about ten feet high and from fifty to sixty feet long by twenty feet wide and more. The foundation of these piles is generally the ground that has been excavated from the adjoining ponds J. This is used so as to create a surface above the reach of high tides. It is next to impossible to recover the salt from the beds of clay without it being contaminated with some of the earth it is made on, which no mechanical process of refining can wholly eliminate. Neither can such foreign substances or compounds as bromin, iodin, sodium sulfate, magnesium chlorid, and sulfate contained in the bittern be entirely separated from the salt owing to the imperfect mode of handling it.

In carrying out my invention I use a hard bottom to crystallize or precipitate the salt on, and I arrange to recover and pile up the salt by flushing or washing it out, preferably by the use of a concentrated solution of sea water or brine, using gravity or pumping, as the lay of the works may permit or require. This is calculated to give me an article (salt) free from all foreign substances, clean, and pure.

My way of proceeding will now be explained in detail, first with reference to Fig. 3 of the drawings, which shows salt-works laid out to conduct operations according to my improved method.

Referring to said Fig. 3, $E^2$ represents a liming-pond similar to the ponds E previously described; but preferably made, bottom and sides, with concrete or like hard material, as the section-lines at the lower edge of Fig. 3 indicate. The salt water conveyed to this pond $E^2$ is drawn, as with the old process, from a receiving-pond, such as is shown at B, Fig. 1, and which requires no further description here. The pond $E^2$ may be subdivided into sections, or several ponds $E^2$ may be provided, and the same may be located either close to the receiving-pond or at a distance therefrom, as required in any case. After the water has deposited its lime and organic matter and reached the proper degree of concentration in the pond or ponds $E^2$, I run it into a concrete or stone-lined ditch $H^2$ through gates, as $i^2$, or through a suitable line of pipes, according to the distance. The ditch $H^2$ is dug below the crystallizing or precipitating ponds $J^2$, which are constructed either of wood, artificial stone, slate, brick, or other hard substance (indicated by the section-lines in the upper part of Fig. 3) on any firm and high land at any elevation that may be necessary to get the best natural advantages for recovering and piling up the salt after it has been crystallized or precipitated. As suggested in said Fig. 3, these ponds $J^2$ are conveniently located on a hillside to take advantage of the slope of the ground in recovering and piling the salt in the manner that will presently be described. The said ponds $J^2$ may be of any suitable size, and when possible I would build them at an elevation of fifteen to twenty feet above the sea-level. As shown, the concentrated water is elevated into them from the ditch $H^2$ by means of a pump O and pipes P, discharging into the several ponds. This water is allowed to remain in the said ponds $J^2$ till the salt is crystallized or precipitated, after which the mother-liquor is run off and the salt drained. The removal of the salt from the crystallizing or precipitating ponds is accomplished in the following manner, which I believe to be entirely new and original in the history of the manufacture of salt; I connect each pond $J^2$ with a series of delivery-pipes Q, having suitable gate-valves R S and projecting over a salt-dump or piling-ground T, above which said pipes are suitably supported. When the salt has crystallized or precipitated to a sufficient depth to be removed and has been drained, as before stated, I attach a hose to the discharge end of the pipes P, that are coupled with the pump O, and direct a stream of concentrated salt water from the ditch $H^2$ onto the crystallized or precipitated salt in the ponds $J^2$ at such a pressure that it will cause the salt to be broken up and carried by the force of the water directed thereon by the hose to the delivery-pipes Q and through them to the piling-place T below. This place is covered up with wood or built of stone or similar material and made sloping toward the ditch $H^2$, so that the water used for flushing or washing out the salt will immediately run off back into said ditch, leaving the solid salt on the dump in piles N, as shown. The pipes Q are arranged on such a pitch or incline as to carry the salt through them by means of the current produced by the water running therein to the piling-ground T from the ponds $J^2$, so the latter will readily discharge their contents. The water that runs back into the ditch from the piling-ground, it will be noted, can be used again, either to extract the salt from it or to wash out the crystallized or precipitated salt. Being practically a saturated solution, of a density of about 25° Baumé, it will not dissolve the salt, and therefore no loss will result from its use in the manner specified. By this means I am enabled to produce salt of great purity, uncontaminated with mud, which by the old methods is unavoidable, and free from the foreign substances or compounds contained in the bittern.

Among other advantages to be gained by the use of my improved process is my ability to use land that is at present considered worthless for any known purpose—to wit, soft, marshy land incapable of any use by reason of its boggy, slimy, and sticky nature, but yet firm enough to support a body of water, so that the same could be partly evaporated by the sun and wind, as in the receiving-pond B hereinbefore described. The partly-evaporated water from such places would be purified and turned into saleable salt with my process by passing through the other parts of the saltworks, which might be located miles away from the receiving-pond. Thus I provide what I believe to be a new, simple, practical, and cheap process of producing and handling solar-evaporated salt, which will effect a great saving in the present cost of producing and handling that product, allowing a large amount to be crystallized or precipitated and handled from one central works, the water being concentrated even at a distance of several miles.

To use my invention in salt-works now in existence, I would reconstruct them and put in my improvements after the manner represented in Fig. 2 of the drawings. The source of supply A and the receiving-pond B are the same in this view as in Fig. 1. The liming-ponds $E^3$, I would line with concrete or similar hard material and have them discharge into a similarly-constructed ditch $H^3$ through suitable gateways, as $i^3$. The crystallizing-ponds $J^3$, I would likewise provide with an artificial-stone surface or other hard bottom, with sides to correspond and drains to let out the mother-liquor after the crystallization of the salt. The concrete or artificial-stone work here referred to is indicated by the section-lines on the right of Fig. 3. The concentrated salt water that would be received in the ditch $H^3$ from the liming-ponds above it could be pumped directly into the ponds $J^3$ by means of an ordinary lift and force pump $O^2$. To remove the crystallized and drained salt from the ponds $J^3$, I would furnish them with gate-valves $R^2$ and delivery-pipes $Q^2$, laid out on an incline in the ditch $H^3$ and connected with a centrifugal pump U. Now it will be understood that by attaching a hose to the pump $O^2$ and forcing a stream of concentrated salt water therethrough and onto the salt to be removed in the manner before described the salt will be washed out of said ponds and floated down the pipes $Q^2$ to the centrifugal pump, which can be used to raise both the water and salt floating therein and made to discharge the same through a suitably-supported line of pipe $Q^3$ on a suitably-prepared and suitably-drained piling-place, where the salt would remain in piles N and the water flow back into the ditch $H^3$. In case the ditch $H^3$ were not deep enough to arrange the pipes $Q^2$ on a proper pitch I would run said pipes into a well from which the water and salt could be pumped to such height as would be necessary to allow the same to flow by gravity to any desired place, where the salt could be piled up and the concentrated water saved for use again, as above described.

By "brine" used in this specification and the claims is meant any kind of salt water, whether obtained from sea, springs, or however obtained.

What I claim, and desire to secure by Letters Patent of the United States, is—

1. The herein-described process of obtaining salt, which comprises the following steps; crystallizing the salt from brine, flushing the salt to wash it after crystallization, and transferring it by such flushing operation, substantially as described.

2. The herein-described process of obtaining salt, consisting in concentrating brine, crystallizing the salt, removing the mother-liquor and draining the salt, flushing the drained salt with a practically-saturated brine, conveying the salt and flushing-brine and permitting the flushing-brine to drain off, substantially as described.

3. The herein-described continuous process of obtaining salt, consisting in concentrating a body-brine then crystallizing the salt from a portion of the brine, then removing the mother-liquid from and draining the crystallized salt, then directing a flushing stream of concentrated brine on the salt thereby simultaneously washing and conveying the salt from the place where it was crystallized, and finally causing the flushing-brine to drain off into the body of brine, substantially as described.

Signed by me at San Francisco, California, this 19th day of June, 1900.

PERCIE H. COWARD. [L. S.]

Witnesses:
 D. E. ALEXANDER,
 L. F. BARLOW.